US008654717B2

(12) United States Patent
Ishii et al.

(10) Patent No.: US 8,654,717 B2
(45) Date of Patent: Feb. 18, 2014

(54) BASE STATION APPARATUS AND COMMUNICATION CONTROL METHOD

(75) Inventors: Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 662 days.

(21) Appl. No.: 12/664,449

(22) PCT Filed: Jun. 16, 2008

(86) PCT No.: PCT/JP2008/061001
§ 371 (c)(1),
(2), (4) Date: Dec. 14, 2009

(87) PCT Pub. No.: WO2008/156064
PCT Pub. Date: Dec. 24, 2008

(65) Prior Publication Data
US 2010/0220652 A1    Sep. 2, 2010

(30) Foreign Application Priority Data
Jun. 19, 2007    (JP) .................................. 2007-161941

(51) Int. Cl.
*H04W 72/00*    (2009.01)
*H04W 72/04*    (2009.01)

(52) U.S. Cl.
USPC .......................... 370/329; 370/343; 370/431

(58) Field of Classification Search
None
See application file for complete search history.

(56) References Cited

U.S. PATENT DOCUMENTS

| 7,471,654 | B2 * | 12/2008 | Mueckenheim et al. | 370/329 |
| 7,505,397 | B2 * | 3/2009 | Lee et al. | 370/208 |
| 7,778,644 | B2 * | 8/2010 | Choi et al. | 455/450 |
| 2007/0133468 | A1 * | 6/2007 | Hara | 370/331 |

OTHER PUBLICATIONS

International Search Report w/translation from PCT/JP2008/061001 dated 09/16/08 (2 pages).
Written Opinion from PCT/JP2008/061001 dated Sep. 16, 2008 (3 pages).
3GPP TSG RAN WG2 #56, R2-063183; "Periodic Scheduling of Uplink Resources for LTE VoIP"; InterDigital Communications Corporation; Riga, Latvia; Nov. 6-10, 2006 (6 pages).
3GPP TR 25.814, V7.0.0; "Physical layer aspects for evolved Universal Terrestrial Radio Access (UTRA)"; Jun. 2006 (126 pages).
3GPP TSG RAN WG Meeting #47bis; R1-070103; "Downlink L1/L2 Control Signaling Channel Structure: Coding"; Sorrento, Italy; Jan. 15-19, 2007 (17 pages).
TSG RAN WG1 LTE AdHoc; R1-060099; "Persistent Scheduling for E-UTRA"; Helsinki, Finland; Jan. 23-25, 2006 (2 pages).

* cited by examiner

*Primary Examiner* — Robert Scheibel
(74) *Attorney, Agent, or Firm* — Osha Liang LLP

(57) ABSTRACT

A base station apparatus to be used for a mobile communication system capable of providing communications using plural frequency carriers is disclosed. The base station apparatus includes a frequency carrier selection unit selecting one of a first frequency carrier and a second frequency carrier as a frequency carrier to be used for the communications based on at least one of a service type of the communications and a congestion degree of the communications, the first frequency carrier being used for communications based on allocation in which radio resources are dynamically allocated, the second frequency carrier being used for communications based on allocation in which the radio resources are allocated at every predetermined period.

10 Claims, 10 Drawing Sheets

BASE STATION APPARATUS AND COMMUNICATION CONTROL METHOD

TECHNICAL FIELD

The present invention generally relates to a base station apparatus and a communication control method in a mobile communication system, and more particularly to a base station apparatus and a communication control method in an LTE (Long Term Evolution) system.

BACKGROUND ART

As a next-generation communication system of the W-CDMA (Wideband Code Division Multiple Access) system or the HSDPA (High Speed Downlink Packet Access) system, an LTE (Long Term Evolution) system has been studied by 3GPP ($3^{rd}$ Generation Partnership Project) which is a standards body of the W-CDMA. More specifically, in the LTE system as a radio access system, an OFDM (Orthogonal Frequency Division Multiplexing) scheme and an SC-FDMA (Single-Carrier Frequency Division Multiple Access) scheme have been studied to be applied to the downlink communications system and the uplink communications system, respectively (see, for example, Non-Patent Document 1).

In the OFDM scheme, a frequency band is divided into plural sub-carriers having narrower frequency bands and data to be transmitted are mapped onto the sub-carriers. By using the orthogonality among the sub-carriers (i.e., independent from each other), the sub-carriers may overlap each other on the frequency axis, thereby enabling improving frequency use efficiency and achieving faster transmission data rate.

In the SC-FDMA scheme, a frequency band is divided into plural narrower frequency bands so that the divided frequency bands are allocated to plural mobile stations to communicate with the mobile stations. Further, in the SC-FDMA scheme, a range of the fluctuation of the transmission power may be made smaller; therefore, lower energy consumption of terminals may be achieved and a wider coverage area may also be obtained.

In both uplink transmissions and downlink transmissions of the LTE system, communications are carried out by allocating one or more physical channels that are shared among plural mobile stations. The channel shared among plural mobile stations is generally called a shared channel. In the LTE system, the shared channel in uplink and the shared channel in downlink are a Physical Uplink Shared Channel (PUSCH) and a Physical Downlink Shared Channel (PDSCH), respectively. Further, as transport channels, the shared channel in uplink and the shared channel in downlink are an Uplink Shared Channel (UL-SCH) and a Downlink Shared Channel (DL-SCH), respectively.

In the LTE system, by dynamically selecting mobile stations communicating using the shared channels, a highly-efficient best-effort-type communication system is achieved.

In the communication system using such a shared channel as described above, it is required to perform signaling (a signaling process) to allocate the shared channel to which mobile station with respect to each sub-frame (having one (1) ms period in the LTE system); and the control channel used for the signaling in the LTE system is called a Physical Downlink Control Channel (PDCCH) or a Downlink L1/L2 Control Channel (DL L1/L2 Control Channel). Further, the Physical Downlink Control Channel (PDCCH) is also used to transmit commands for transmission power control and the Acknowledgement Information (ACK/NACK) with respect to the Uplink Shared Channel (UL-SCH).

The information items transmitted via the Physical Downlink Control Channel (PDCCH) include, for example, a Downlink L1/L2 Control Channel Format Indicator (DL L1/L2 Control Channel Format Indicator), Downlink Scheduling Information, the Acknowledgement Information (ACK/NACK), Uplink Scheduling Grant, an Overload Indicator, Transmission Power Control Command Bit and the like (see, for example, Non-Patent Document 2).

Further, the Downlink L1/L2 Control Channel Format Indicator (DL L1/L2 Control Channel Format Indicator) may also be called a Physical Control Format Indicator Channel (PCFICH). Further, the Downlink Scheduling Information may also be called Downlink Scheduling Grant or Downlink Assignment Information. Further, the Downlink Scheduling Information and the Uplink Scheduling Grant may also be collectively called Downlink Control Information (DCI).

Further, the Downlink Scheduling Information may include information items regarding the Downlink Shared Channel (DL-SCH), such as allocation information of downlink Resource Blocks, an ID of a user equipment (UE) terminal (mobile station), the number of streams, information of Precoding Vector, data size, modulation scheme, information of an HARQ (Hybrid Automatic Repeat reQuest) and the like. Further, the Uplink Scheduling Grant may include information items regarding the Downlink Shared Channel (DL-SCH), such as allocation information of uplink Resource Blocks, the ID of a user equipment (UE) terminal (mobile station), the data size, the modulation scheme, uplink transmission power information, information of a Demodulation Reference Signal in an uplink MIMO and the like.

Currently, it is being studied that approximately forty (40) to approximately one hundred (100) bits are to be allocated to the Downlink Scheduling Information or the Uplink Scheduling Grant. This number of bits may be suitable when used in a high transmission data rate such as 10 Mbps through 100 Mbps but may not be suitable when used in a voice signal having a transmission data rate in a range between approximately 10 kbps and approximately 12 kbps. More specifically, if the number of bits of the Downlink Scheduling Information is 50, this transmission data rate (50 kbps, i.e., 50 bits per 1 ms) of the Downlink Scheduling Information exceeds the typical transmission data rate of the actual data signals (which is in a range between approximately 10 kbps and approximately 20 kbps), which may degrade the efficiency of the communications.

To overcome the problem, in the LTE system, with respect to user data having a substantially constant transmission data rate such as a voice service like VoIP, PoC, Speech service or the like, one scheduling scheme has been proposed to be used in which radio resources are repeatedly allocated every predetermined period instead of using a best-effort-type scheduling scheme in which the radio resources are dynamically allocated in order to obtain higher use efficiency (see, for example, Non-Patent Document 3). This proposed scheduling scheme is called Persistent Scheduling, Semi-persistent Scheduling or the like. On the other hand, the scheduling scheme normally used in which the radio resources are dynamically allocated is called Dynamic Scheduling or the like.

Non-Patent Document 1: 3GPP TR 25.814 (V7.0.0), "Physical Layer Aspects for Evolved UTRA," June 2006

Non-Patent Document 2: 3GPP R1-070103, "Downlink L1/L2 Control Signaling Channel Structure: Coding"

Non-Patent Document 3: 3GPP R1-060099, "Persistent Scheduling for E-UTRA," January, 2006

DISCLOSURE OF INVENTION

Problems to be Solved by the Invention

As described above, in the LTE system, the user data to which the Persistent Scheduling scheme is applied may be mixed with the user data to which the Dynamic Scheduling scheme is applied.

In this case, to avoid overlap between the radio resources allocated based on the Persistent Scheduling scheme and the radio resources allocated based on the Dynamic Scheduling scheme, it may be required to perform a complex control process in each sub-frame by, for example, reserving radio resources to be allocated in the Persistent Scheduling scheme and then allocating radio resources to user data to which the Dynamic Scheduling scheme is to be applied.

Further, to more effectively use the radio resources, in a case where there are no user data to which the Persistent Scheduling scheme is to be applied, it may be required to reallocate the radio resources having been reserved for the Persistent Scheduling scheme to the user data to which the Dynamic Scheduling scheme is to be applied, which may make the control process more difficult.

Further, there is a difference between the required frequency resolution of the frequency resources for the user data to which the Dynamic Scheduling is to be applied, the user data having a target transmission data rate from 10 Mbps to 100 Mbps, and the required frequency resolution of the frequency resources for the user data to which the Persistent Scheduling is to be applied, the user data having a target transmission data rate from 10 kbps to 20 kbps; therefore, it may become difficult to effectively allocate the frequency resources. For example, with respect to the user data to which Dynamic Scheduling scheme is to be applied, even when the frequency resolution of the frequency resources is approximately 900 kHz, the frequency resources may be effectively allocated. However, with respect to the user data to which Persistent Scheduling scheme is to be applied, approximately 180 kHz frequency resolution may be required.

According to an embodiment of the present invention, there may be provided a base station apparatus and a communication control method capable of adequately and effectively applying scheduling schemes to the user data to be transmitted and received based on the Dynamic Scheduling scheme as well as the user data to be transmitted and received based on the Persistent Scheduling scheme.

Means for Solving the Problems

According to a first aspect of the present invention, there is provided a base station apparatus to be used for a mobile communication system capable of providing communications using plural frequency carriers. The base station apparatus includes a frequency carrier selection unit selecting one of a first frequency carrier and a second frequency carrier as a frequency carrier to be used for the communications based on at least one of a service type of the communications and a congestion degree of the communications, the first frequency carrier being used for communications based on an allocation in which radio resources are dynamically allocated, the second frequency carrier being used for communications based on an allocation in which the radio resources are allocated at every predetermined period.

The base station apparatus may further include a frequency carrier setting unit setting the first frequency carrier and the second frequency carrier. Further, the frequency carrier setting unit may set one or more first frequency carriers and one or more second frequency carriers.

Further, it may be useful that when the service type is a voice service, the frequency carrier selection unit selects the second frequency carrier, or when the service type is a service other than a voice service, the frequency carrier selection unit selects the first frequency carrier. Preferably, when the service type is a combined service combining a voice service and a service other than the voice service, the frequency carrier selection unit may select the first frequency carrier.

Further, when the service type is a voice service, the frequency carrier selection unit may select one of the first frequency carrier and the second frequency carrier based on the congestion degree.

Further, preferably, the congestion degree refers to a congestion degree of the communications using the second frequency carrier and is determined based on at least one of a number of mobile stations communicating using the second frequency carrier, a value of downlink transmission power, and an amount of frequency resources used in uplink or downlink.

Further, it may be useful that the number of mobile stations refers to at least one of a number of mobile stations having data to be transmitted in a downlink transmission buffer, a number of mobile stations having data to be transmitted in a uplink transmission buffer, a number of mobile stations which are not in DRX mode, a number of mobile stations in RRC connected mode and a number of mobile stations having a transmission data rate less than a predetermined threshold value.

Further, the voice service may refer to Voice over IP, PoC, or Speech service.

According to a second aspect of the present invention, there is provided a communication control method for controlling communications in a mobile communication system capable of providing communications using plural frequency carriers. The communication control method includes a frequency carrier setting step of setting a first frequency carrier and a second frequency carrier, the first frequency carrier being used for communications based on allocation in which radio resources are dynamically allocated, the second frequency carrier being used for communications based on allocation in which the radio resources are allocated at every predetermined period and a frequency carrier selection step of selecting one of the first frequency carrier and the second frequency carrier based on at least one of a service type of the communications and a congestion degree of the communications.

Advantageous Effect of the Invention

According to an embodiment of the present invention, there may be provided a base station apparatus and a communication control method capable of adequately and effectively applying scheduling schemes to the user data to be transmitted and received based on the Dynamic Scheduling scheme as well as the user data to be transmitted and received based on the Persistent Scheduling scheme.

EXPLANATION OF REFERENCES

50: CELL
$100_n$, $110_m$, 120: MOBILE STATION(S)
102: TRANSMISSION/RECEIVING ANTENNA
104: AMPLIFIER
106: TRANSMISSION/RECEIVING SECTION
108: BASEBAND SIGNAL PROCESSING SECTION
200: BASE STATION APPARATUS
202: TRANSMISSION/RECEIVING ANTENNA
204: AMPLIFIER
206: TRANSMISSION/RECEIVING SECTION
208: BASEBAND SIGNAL PROCESSING SECTION
210: CALL PROCESSING SECTION
212: TRANSMISSION PATH INTERFACE
214: CONGESTION DEGREE DETERMINATION SECTION
2081: FIRST-FREQUENCY-CARRIER LAYER 1 PROCESSING SECTION
2082: FIRST-FREQUENCY-CARRIER MAC PROCESSING SECTION
2083: FIRST-FREQUENCY-CARRIER RLC PROCESSING SECTION
2084: SECOND-FREQUENCY-CARRIER LAYER 1 PROCESSING SECTION
2085: SECOND-FREQUENCY-CARRIER MAC PROCESSING SECTION
2086: SECOND-FREQUENCY-CARRIER RLC PROCESSING SECTION
300: ACCESS GATEWAY APPARATUS
400: CORE NETWORK

BEST MODE FOR CARRYING OUT THE INVENTION

Next, a best mode carrying out the present invention is described based on the following embodiments with reference to the accompanying drawings. Throughout the descriptions and the figures, the same or corresponding numbers are used to refer to the parts having the same or corresponding function and repeated descriptions may be omitted.

Figure 1:
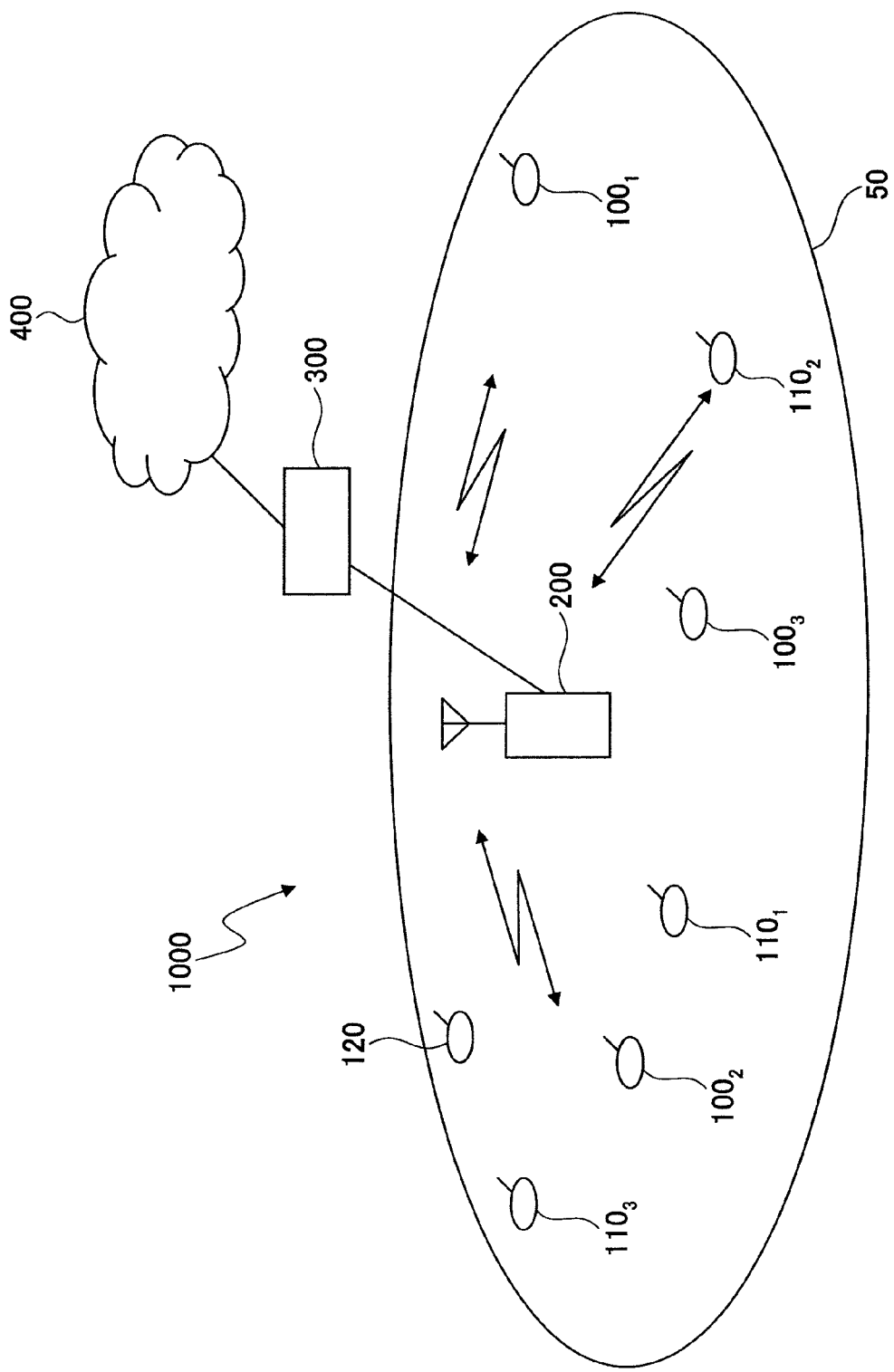
FIG. 1 is a schematic drawing showing a radio communication system including a base station apparatus according to an embodiment of the present invention.

First, with reference to FIG. 1, a radio communication system 1000 is described including a base station apparatus 200 according to an embodiment of the present invention.

As shown in FIG. 1, the radio communication system 1000, which may be, for example, an Evolved UTRA and UTRAN (a.k.a. a Long Term Evolution (LTE) or a Super 3G) system, includes the base station apparatus (eNB: eNode B) 200, plural mobile stations (i.e., User Equipment (UE) terminals) $100_n$ ($100_1$, $100_2$, $100_3$, . . . $100_n$; n: an integer greater than zero (0)), plural mobile stations $110_m$ ($110_1$, $110_2$, $110_3$, . . . $110_m$; m: an integer greater than zero (0)), and a mobile station 120. The base station apparatus 200 is connected to an upper node station such as an access gateway apparatus 300. The access gateway apparatus 300 is connected to a core network 400.

Figure 2:
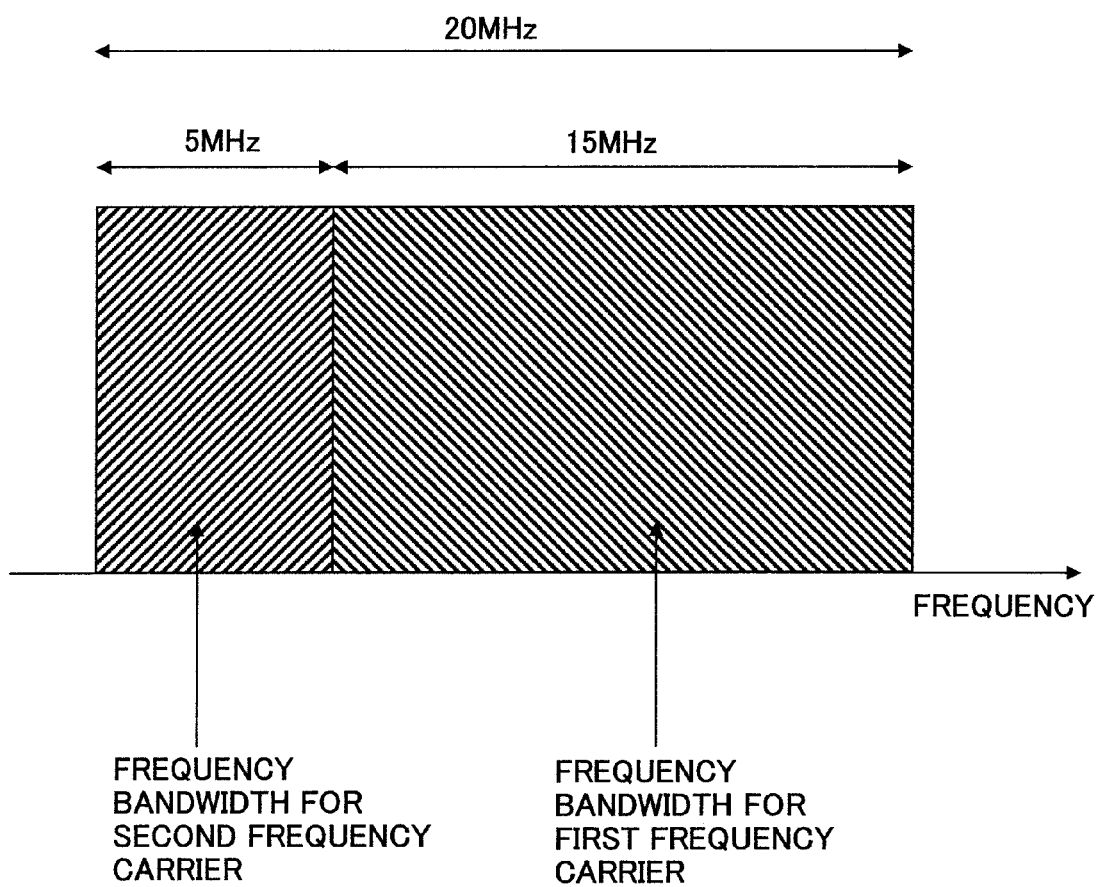
FIG. 2 is a drawing showing an exemplary configuration of frequency carriers in the base station apparatus and a communication control method according to an embodiment of the present invention.

FIG. 2 shows an exemplary configuration of frequency carriers in the radio communication system 1000. According to an embodiment of the present invention, as shown in FIG. 2, it is assumed that the radio communication system 1000 (in FIG. 1) has a 20 MHz frequency band as a whole. This 20 MHz frequency band is divided into a first frequency carrier having an allocated 15 MHz frequency bandwidth and a second frequency carrier having an allocated 5 MHz frequency bandwidth. The first frequency carrier is used for communications based on the Dynamic Scheduling; and the second frequency carrier is used for communications based on the Persistent Scheduling.

However, the present invention is not limited to the configuration shown in FIG. 2. Namely, for example, the entire frequency bandwidth is not limited to 20 MHz and may be 10 MHz, 30 MHz or the like. Further, the frequency bandwidth of the first frequency carrier is not limited to 15 MHz and may be any other values such as 10 MHz, 5MHz or the like; and similarly, the frequency bandwidth of the second frequency carrier is not limited to 5 MHz and may be any other values such as 10 MHz, 15 MHz or the like. Further, according to the configuration of FIG. 2, there are provided one first frequency carrier and one second frequency carrier within the entire 20 MHz frequency bandwidth. However, the present invention is not limited to this configuration, and there may be provided two or more first frequency carriers and/or two or more second frequency carriers within the entire frequency bandwidth. For example, within the entire 20 MHz frequency bandwidth, there may be provided a first frequency carrier having 5 MHz frequency bandwidth, a second frequency carrier having 10 MHz frequency bandwidth, and another first frequency carrier having 5 MHz frequency bandwidth. Further, for example, within the entire 20 MHz frequency bandwidth, there may be provided two first frequency carriers and two second frequency carriers each having 5 MHz frequency bandwidth.

Further, the number of frequency carriers in the entire frequency bandwidth, the frequency bandwidth of the first frequency carrier, the frequency bandwidth of the second frequency carrier and the like may be determined in the base station apparatus 200 during the installation of the base station apparatus 200 or may be set based on a predetermined instruction signal transmitted to the base station apparatus 200 via the access gateway apparatus 300 after the installation of the base station apparatus 200.

Referring back to FIG. 1, in a cell 50, the mobile stations $100_n$ and the mobile stations $110_m$ are in communication with the base station apparatus 200 in the radio communication system 100 to which the Evolved UTRA and UTRAN scheme is applied. Namely connections have been established between the mobile stations $100_n$ and the base station apparatus 200 as well as between the mobile stations $110_m$ and the base station apparatus 200; and therefore, the mobile stations 100$_n$ and the mobile stations 110$_m$ are in LTE Active mode. Further, for explanatory purposes, it is assumed that the mobile stations 100$_n$ are in communication using the first frequency carrier and that the mobile stations 110$_m$ are in communication using the second frequency carrier. In other words, it is assumed that the communications based on the Dynamic Scheduling are established between the mobile stations 100$_n$ and the base station apparatus 200 and that the communications based on the Persistent Scheduling are established between the mobile stations 110$_m$ and the base station apparatus 200.

Further, it is assumed that the connection between the mobile station 120 and the base station apparatus 200 has not been established yet and that the mobile station 120 is about to newly start communication with the base station apparatus 200 based on the Evolved UTRA and UTRAN scheme in the cell 50.

The mobile stations 100$_n$ (100$_1$, 100$_2$, 100$_3$, ... 100$_n$) or the mobile stations 110$_m$ (110$_1$, 110$_2$, 110$_3$, ... 110$_m$) have the same configuration, functions, and modes; and therefore, unless otherwise described, those mobile stations are collectively called a mobile station(s) 100$_n$ or a mobile station(s) 110$_m$, respectively. Further, in the cell 50, the mobile station 120 is used (described) as one example of the mobile stations that are about to newly start communication with the base station apparatus 200 based on the Evolved UTRA and UTRAN scheme. In FIG. 1, there is only one mobile station 120 depicted. However, there may be provided two or more such mobile stations 120 in the cell 50.

In the radio communication system 1000, as a radio access scheme, an OFDM (Orthogonal Frequency Division Multiplexing) scheme and an SC-FDMA (Single-Carrier Frequency Division Multiple Access) scheme are applied to downlink communications and uplink communications, respectively. As described above, in the OFDM scheme, a frequency band is divided into plural frequency bands (sub-carriers) so that data can be transmitted using the frequency bands. On the other hand, in the SC-FDMA scheme, a frequency band is divided into plural narrower frequency band so that data can be transmitted using different frequency bands among plural mobile stations. Base on the scheme, it may become possible to reduce the interference among mobile stations.

Next, communication channels used in the Evolved UTRA and UTRAN scheme are described.

First, communications channels in a case where the Dynamic Scheduling is applied are described.

In downlink communication, a Physical Downlink Shared Channel (PDSCH) used and shared among the mobile stations 100$_n$ and an LTE downlink control channel are used. In downlink communication, the LTE downlink control channel transmits Downlink Scheduling Information, Uplink Scheduling Grant, and Acknowledgement Information, the Downlink Scheduling Information including user information and transport format information to be mapped onto the Physical Downlink Shared Channel (PDSCH), the Uplink Scheduling Grant including user information and transport format information to be mapped onto a Physical Uplink Shared Channel (PUSCH); and user data are transmitted using the Physical Downlink Shared Channel (PDSCH).

The Downlink Scheduling Information may also be called a Downlink Scheduling Grant or Downlink Assignment Information. Further, the Downlink Scheduling Information and the Uplink Scheduling Grant may be collectively called Downlink Control Information (DCI).

In uplink communication, the Physical Uplink Shared Channel (PUSCH) used and shared among the mobile stations 100$_n$ and an LTE uplink control channel are used.

There are two types of the uplink control channels: in one type, the channel is time-domain multiplexed with the Physical Uplink Shared Channel (PUSCH), and in the other type, the channel is frequency-domain multiplexed with the Physical Uplink Shared Channel (PUSCH).

In uplink communication, the LTE uplink control channel transmits downlink quality information (i.e., Channel Quality Indicators (CQI)) and acknowledgement information with respect to the Physical Downlink Shared Channel (PDSCH) (HARQ ACK information), the downlink quality information being used for scheduling and an Adaptive Modulation and Coding Scheme (AMCS) for the Physical Downlink Shared Channel (PDSCH). Further, user data are transmitted using the Physical Uplink Shared Channel (PUSCH).

Next, communications channels are described in a case where the Persistent Scheduling is applied.

The communication channel in the Persistent Scheduling is different from that in the Dynamic Scheduling in that the communication channel in the Persistent Scheduling does not typically have the Downlink Scheduling Information nor the Uplink Scheduling Grant. Namely in a case where the Persistent Scheduling is applied, neither the Downlink Scheduling Information nor the Uplink Scheduling Grant is provided. Alternatively, the radio resources of the Physical Downlink Shared Channel (PDSCH) and the Physical Uplink Shared Channel (PUSCH) for transmitting the user data (i.e., the sub-frames to be used for transmitting frequency resource amount, transmission power, modulation scheme, and user data) are semi-statically allocated. In this case, the radio resources may be repeatedly allocated every predetermined period such as, for example, 20 ms. The information of the radio resources (i.e., the sub-frames to be used for transmitting frequency resource amount, transmission power, modulation scheme, and user data and the like) are transmitted from the base station apparatus 200 to the mobile stations 110$_m$ using an RRC (Radio Resource Control) message.

Otherwise, in the Persistent Scheduling scheme, the information of the radio resources may be transmitted not using the RRC message but using the Downlink Scheduling Information or the Uplink Scheduling Grant. In this case, the Downlink Scheduling Information or the Uplink Scheduling Grant may be transmitted with respect to only header data in the periodic transmission based on the Persistent Scheduling; namely, the Downlink Scheduling Information or the Uplink Scheduling Grant may be transmitted only at the timing when a Talk Spurt period starts. Upon receiving the Downlink Scheduling Information or the Uplink Scheduling Grant indicating the resource allocation based on the persistent Scheduling, the mobile station starts communications using the Persistent Scheduling based on the information of the radio resources transmitted using the Downlink Scheduling Information or the Uplink Scheduling Grant.

Otherwise, in the Persistent Scheduling scheme, the information of the radio resources may be transmitted using not only the RRC message but also the Downlink Scheduling Information or the Uplink Scheduling Grant.

Further, in the above description, a case is described where, by using the second frequency carrier, the mobile station 110$_m$ transmits and receives the user data with the base station apparatus 200 based on the Persistent Scheduling. However, in special cases, the mobile station 110$_m$ may transmit and receive the user data with the base station apparatus 200 based on the Dynamic Scheduling. As an example of the special cases, there may be a case where a Dedicated Control Channel (DCCH) which is a control signal or the VoIP data before header compression is performed are transmitted or received. In such a case, the user data may be transmitted and received based on the Dynamic Scheduling using the second frequency carrier.

Figure 3:
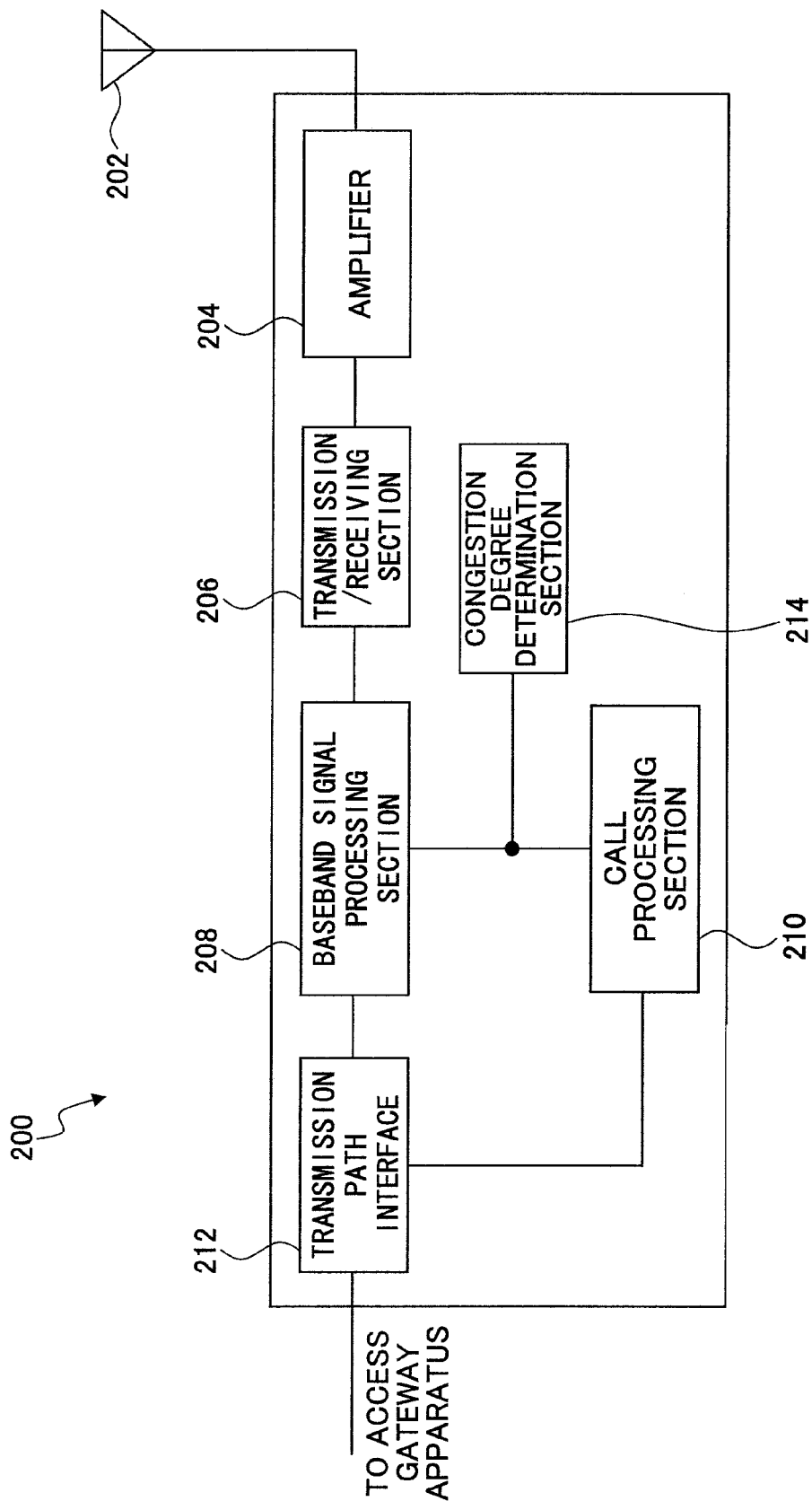
FIG. 3 is a schematic block diagram of a base station apparatus according to an embodiment of the present invention.

Next, the base station apparatus 200 according to an embodiment of the present invention is described with reference to FIG. 3. As shown in FIG. 3, the base station apparatus 200 includes a transmission/receiving antenna 202, an amplifier 204, a transmission/receiving section 206, a baseband signal processing section 208, a call processing section 210, a transmission path interface 212, and a congestion degree determination section 214.

The packet data to be transmitted from the base station apparatus 200 to the mobile station $100_n$ in downlink are transmitted from the an upper node station such as the access gateway apparatus 300 to the baseband signal processing section 208 via the transmission path interface 212.

In the baseband signal processing section 208, with respect to the data of the first frequency carrier and the data of the second frequency carrier, a PDCP (Packet Data Convergence Protocol)-layer transmission process, a segmentation and concatenation process on the packet data, RLC (Radio Link Control)-layer transmission processes such as a transmission process of RLC retransmission control data, MAC retransmission control processes, such as an HARQ (Hybrid Automatic Repeat reQuest) transmission process, a scheduling process, a transport format selection process, a channel coding process, an IFFT (Inverse Fast Fourier Transform) process and the like are performed, and the processed data are transmitted to the transmission/receiving section 206. As a scheduling scheme, the Dynamic Scheduling scheme is applied to the data using the first frequency carrier and the Persistent Scheduling scheme is mainly applied to the data using the second frequency carrier.

In the transmission/receiving section 206, the frequency of the baseband signal output from the baseband signal processing section 208 is converted into a frequency of a radio frequency band. By doing this, the baseband signals for the first frequency have a frequency belonging the radio frequency band of the first frequency carrier, and the baseband signals for the second frequency have a frequency belonging the radio frequency band of the second frequency carrier. Then, the frequency-converted baseband signals are amplified by the amplifier 204 and transmitted via the transmission/receiving antenna 202.

On the other hand, with respect to the data transmitted from the mobile station $100_n$ to the base station apparatus 200 in uplink, a radio frequency signal received by the transmission/receiving antenna 202 is amplified by the amplifier 204. Then, the frequency of the amplified radio frequency signal is converted in the transmission/receiving section 206 to obtain a baseband signal. Then, the baseband signal is input into the baseband signal processing section 208.

In the baseband processing section 208, with respect to the input baseband signal, various processes such as an FFT (Fast Fourier Transform) process, an IDFT (Inverse Discrete Fourier Transform) process, an error correction decoding process, a reception process of the MAC retransmission control data, an RLC-layer data reception process, a PDCP-layer data reception process and the like are performed. Then the processed signal is transmitted to the access gateway apparatus 300 via the transmission path interface 212. Those processes are performed on the data of the first frequency carrier and the data of the second frequency carrier.

Further, as described in detail below, the baseband signal processing section 208 measures a congestion degree in the second frequency carrier and transmits the measured congestion degree to the congestion degree determination section 214.

The congestion degree determination section 214 receives the measured value of the transmission power in downlink from a second-frequency-carrier layer 1 processing section 2084 (FIG. 4) in the baseband signal processing section 208. Further, the congestion degree determination section 214 receives reports of an amount of frequency resources used in uplink, an amount of frequency resources used in downlink, and the number of mobile stations communicating using the second frequency carrier from a second-frequency-carrier MAC processing section 2085 (FIG. 4) in the baseband signal processing section 208. Further, the congestion degree determination section 214 receives reports of an amount of buffer used for the RLC layer from a second-frequency-carrier RLC processing section 2086 (FIG. 4) in the baseband signal processing section 208.

Further, as the number of mobile stations communicating using the second frequency carrier, for example, the number of mobile stations having data to be transmitted in the downlink transmission buffer, the number of mobile stations having data to be transmitted in the uplink transmission buffer, the number of mobile stations which are not in Discoutinuous Reception (DRX) mode, the number of mobile stations in Radio Resource Control (RRC) connected mode, the number of mobile stations having a transmission data rate less than a predetermined threshold value or the like may be used. Further, the number of mobile stations may be defined by using plural numbers of mobile stations described above so that the congestion degree is determined by comparing each of the plural numbers of mobile stations with the corresponding threshold values described below. Further, the uplink transmission buffer and the downlink transmission buffer described above may be a MAC-layer transmission buffer or an RLC-layer transmission buffer. Further, the DRX mode refers to a mode in which intermittent reception is performed. More specifically, the DRX mode refers to a mode in which the mobile station intermittently receives a signal only at a predetermined specific timing. The DRX mode may be applied in order to reduce the power consumption of the mobile station when there are few or no data to be transmitted/received.

As the number of mobile stations (communicating using the second frequency carrier), when the number of mobile stations having data to be transmitted in the downlink transmission buffer, the number of mobile stations having data to be transmitted in the uplink transmission buffer, or the number of mobile stations having a transmission data rate less than a predetermined threshold value is to be used, the number of mobile stations may be obtained not from the second-frequency-carrier MAC processing section 2085 in the baseband signal processing section 208 but from the second-frequency-carrier RLC processing section 2086 in the baseband signal processing section 208. Further, as the number of mobile stations communicating using the second frequency carrier, the number of mobile stations which are not in a Discontinuous Reception (DRX) mode or the number of mobile stations in a Radio Resource Control (RRC) connected mode is used, the number of mobile stations may be obtained by the call processing section 210 (FIGS. 3 and 4) managing the status of the mobile stations.

Further, the congestion degree determination section 214 determines the congestion degree of communications using the second frequency carrier in the cell 50 based on at least one of the transmission power in downlink, the amount of frequency resources used in uplink, the amount of frequency resources used in downlink, the number of mobile stations communicating using the second frequency carrier, and the amount of buffer used for the RLC layer.

For example, the congestion degree determination section 214 defines a first threshold value TH1, a second threshold value TH2, a third threshold value TH3, a fourth threshold value TH4, and a fifth threshold value TH5 and determines the congestion degree of the communications using the second carrier in the cell 50 based on at least one of the relationships between the transmission power in downlink and the first threshold value TH1, between the amount of frequency resources used in uplink and the second threshold value TH2, between the amount of frequency resources used in downlink and the third threshold value TH3, between the number of mobile stations communicating using the second frequency carrier and the fourth threshold value TH4, and between the amount of buffer used for the RLC layer and the fifth threshold value TH5.

More specifically, to determine the congestion degree, for example, the following five (5) determination formulas (inequalities) may be used.
Five (5) determination formulas:
1:(Transmission power in downlink)>TH1;
2:(Amount of frequency resources used in uplink)>TH2;
3:(Amount of frequency resources used in downlink)>TH3;
4:(The number of mobile stations communicating using the second frequency carrier)>TH4;
5:(Amount of buffer used for the RLC layer)>TH5.

In this case, for example, when at least one of the above determination formulas (inequalities) is true (satisfied), it may be determined that the congestion degree of the communications using the second frequency carrier is high; and when none of the above determination formulas (inequalities) is true (satisfied), it may be determined that the congestion degree of the communications using the second frequency carrier is not high. Otherwise, when all of the above determination formulas (inequalities) are true (satisfied), it may be determined that the congestion degree of the communications using the second frequency carrier is high; and when at least one of the above determination formulas (inequalities) is not true (not satisfied), it may be determined that the congestion degree of the communications using the second frequency carrier is not high. Further, in the above description, a case is described where all of the five (5) determination formulas (inequalities) are used. However, for example, the congestion degree of the communications using the second frequency carrier may be determined based on only some of the five (5) determination formulas (inequalities). Further, the congestion degree determination section 214 transmits the determination result to the call processing section 210.

Among five (5) determination formulas (inequalities), only one determination formula (inequality) is provided with respect to the number of mobile stations communicating using the second frequency carrier. However, as described above, there may be provided plural definitions describing the number of mobile stations. Therefore, plural determination formulas (inequalities) corresponding to the definition of the number of mobile stations may be defined and used to determine the congestion degree.

Further, as the criteria for determining the congestion degree, a baseband use rate in the base station apparatus, a memory use rate, a CPU use rate, a reception level or interference level in uplink or the like may be used in addition to the transmission power in downlink, the amount of frequency resources used in uplink, the amount of frequency resources used in downlink, the number of mobile stations communicating using the second frequency carrier, and the amount of buffer used for the RLC layer. Namely, for example, the congestion degree determination section 214 may further define the determination formulas (inequalities) corresponding to the baseband use rate in the base station apparatus, the memory use rate, the CPU use rate, and the reception level or interference level in uplink in addition to the above five determination formulas (inequalities) and determine the congestion degree based on those determination formulas (inequalities). Further, data of the baseband use rate in the base station apparatus, the memory use rate, and the CPU use rate may be obtained in, for example, the call processing section 210 and transmitted to the congestion degree determination section 214; and the reception level or interference level in uplink may be obtained in, for example, the second-frequency-carrier layer 1 processing section 2084 of the baseband signal processing section 208 and transmitted to the congestion degree determination section 214.

The call processing section 210 performs call processing such as establishing and releasing communication channels, management of the status of the base station apparatus 200, and management of the radio resources. Within an allowed frequency bandwidth (such as 20 MHz) in the radio communication system 1000, the call processing section 210 sets the first frequency carrier (having a frequency bandwidth of, for example, 15 MHz) to be used for the communications based on the Dynamic Scheduling and the second frequency carrier (having a frequency bandwidth of, for example, 5 MHz) to be used for the communications based on the Persistent Scheduling (see FIG. 2). This setting may be performed during the installation of the base station apparatus 200 or this setting may be performed by using an external command signal after the installation. Further, the call processing section 210 receives the determination result of the congestion degree of the communications using the second frequency carrier from the congestion degree determination section 214. Further, the call processing section 210 may determine a service type of the communications to be newly started (established) between the base station apparatus 200 and the mobile station 120.

The call processing section 210 selects a frequency carrier to be used for the communication with the mobile station 120 based on at least one of the service type (or data type) of the communications to be newly started with the mobile station 120 in the cell 50 and the determination result of the congestion degree received from the congestion degree determination section 214.

For example, in a case where one of the frequency carriers is to be selected based on the service type, when determining that the service type (or data type) of the communications to be newly started with the mobile station 120 is a voice service, the call processing section 210 sets the second frequency carrier as the frequency carrier to be used for the communications between the mobile station 120 and the base station apparatus 200. Namely, in this case, the mobile station 120 newly communicates with the base station apparatus. 200 using the second frequency carrier.

Herein, the term voice service refers to, for example, Speech service, PoC (Push-to-talk over Cellular), VoP, AMR (Adaptive Multi-Rate CODEC), AMR-WB (Wideband) and the like. Further, a Streaming Service may be included in the voice service. The PoC refers to a transceiver-type voice service performed on a Cellular system (i.e., a mobile communication system).

Further, for example, when determining that the service type (or data type) of the communications to be newly started with the mobile station 120 is a service other than the voice service, the call processing section 210 sets the first frequency carrier as the frequency carrier to be used for the communications between the mobile station 120 and the base station apparatus 200. Namely, in this case, the mobile station 120 newly communicates with the base station apparatus 200 using the first frequency carrier.

Herein, the term the service other than the voice service refers to a service such as i-mode (registered trademark: a mobile (wireless) Internet service available in Japan), Web-browsing, FTP, PPP, mail transmission/receiving service and the like.

Further, for example, when determining that the service type (or data type) of the communications to be newly started with the mobile station 120 is a combined service combining the voice service and the service other than the voice service, the call processing section 210 sets the first frequency carrier as the frequency carrier to be used for the communications between the mobile station 120 and the base station apparatus 200. Namely, in this case, the mobile station 120 newly communicates with the base station apparatus 200 using the first frequency carrier. Further, the combined service combining the voice service and the service other than the voice service and a service simultaneously providing the voice service and the service other than the voice service may be called a multi-call service.

Further, for example, when determining that the service type (or data type) of the communications to be newly started with the mobile station 120 is a feature-rich voice service, the call processing section 210 may set the first frequency carrier as the frequency carrier to be used for the communications between the mobile station 120 and the base station apparatus 200. Namely, in this case, the mobile station 120 newly communicates with the base station apparatus 200 using the first frequency carrier. Whether the service type (or data type) of the communications to be newly started with the mobile station 120 is the feature-rich voice service may be determined based on a predetermined service type or a relationship between the transmission data rate of the feature-rich voice service and a predetermined threshold value. For example, in the latter case, a value of 30 kbps is set as the threshold value and when determining that the transmission data rate of the feature-rich voice service is equal to or greater than 30 kbps, it may be determined that the call processing section 210 should set the first frequency carrier as the frequency carrier to be used for the communications between the mobile station 120 and the base station apparatus 200; and when determining that the transmission data rate of the feature-rich voice service is less than 30 kbps, it may be determined that the call processing section 210 should set the second frequency carrier as the frequency carrier to be used for the communications between the mobile station 120 and the base station apparatus 200. Otherwise, whether the service type (or data type) of the communications to be newly started with the mobile station 120 is the feature-rich voice service may be determined based on a type of logical channel onto which the feature-rich voice service is to be mapped or a priority level of the logical channel.

Further, the above service type (or data type) may include a contract type. In this case, the contact type may be used as a criterion for selecting the first frequency carrier or the second frequency carrier to be used for the communications between the mobile station 120 and the base station apparatus 200 in the cell 50. Herein, the contract type may be classified as, for example, a pay-as-you-go-payment-type contract in which a billing amount varies depending on an amount of transmitted data or a flat-payment-type contract in which the billing amount is fixed. Otherwise, for example, the contract type may be classified as a high-class contract having a higher priority level or a low-class contract having a lower priority level.

In this case, for example, when determining that the service type is the high-class contract and is the voice service as well, the call processing section 210 may set the second frequency carrier as the frequency carrier to be used for the communications between the mobile station 120 and the base station apparatus 200; on the other hand, when determining that the service type is not the high-class contract and is not the voice service, either, the call processing section 210 may set the first frequency carrier as the frequency carrier to be used for the communications between the mobile station 120 and the base station apparatus 200.

Further, the call processing section 210 may select the frequency carrier to be used for the communication with the mobile station 120 based on the service type (data type, contract type) of the communications to be newly started with the mobile station 120 in the cell 50 and the congestion degree of the communications using the second frequency carrier in the cell 50.

For example, when determining that the service type of the communications to be newly started with the mobile station 120 is the voice service and that the congestion degree of the communications using the second frequency carrier is not high, the call processing section 210 sets the second frequency carrier as the frequency carrier to be used for the communications between the mobile station 120 and the base station apparatus 200. Namely, in this case, the mobile station 120 newly communicates with the base station apparatus 200 using the second frequency carrier.

On the other hand, when determining that the service type of the communications to be newly started with the mobile station 120 is the voice service and that the congestion degree of the communications using the second frequency carrier is high, the call processing section 210 sets the first frequency carrier as the frequency carrier to be used for the communications between the mobile station 120 and the base station apparatus 200. Namely, in this case, the mobile station 120 newly communicates with the base station apparatus 200 using the first frequency carrier. Further, in this case, the call processing section 210 may increase the priority level of the resource allocation with respect to the mobile station 120 to perform communications using the first frequency carrier. By doing this, it may become possible to satisfy the QoS (Quality of Service) requirement of the voice service even in the communications using the first frequency carrier providing a best-effort-type service.

Herein, the term voice service refers to, for example, Speech service, PoC (Push-to-talk over Cellular), VoP, AMR (Adaptive Multi-Rate CODEC), AMR-WB (Wideband) and the like. Further, a Streaming Service may be included in the voice service. The PoC refers to a transceiver-type voice service performed on a Cellular system (i.e., a mobile communication system).

Further, the call processing section 210 may select the frequency carrier to be used for the communication with the mobile station 120 only based on the congestion degree of the communications using the second frequency carrier in the cell 50.

After selecting the frequency carrier, the call processing section 210 performs processes so that the communications based on the Evolved UTRA and UTRAN between the mobile station 120 and the base station apparatus 200 can be newly started. More specifically, the call processing section 210 exchanges control signals with the mobile station 120 to start the communications and sets necessary settings to communicate between the mobile station 120 and the base station apparatus 200.

Next, an exemplary configuration of the baseband signal processing section 208 is described with reference to FIG. 4.

Figure 4:
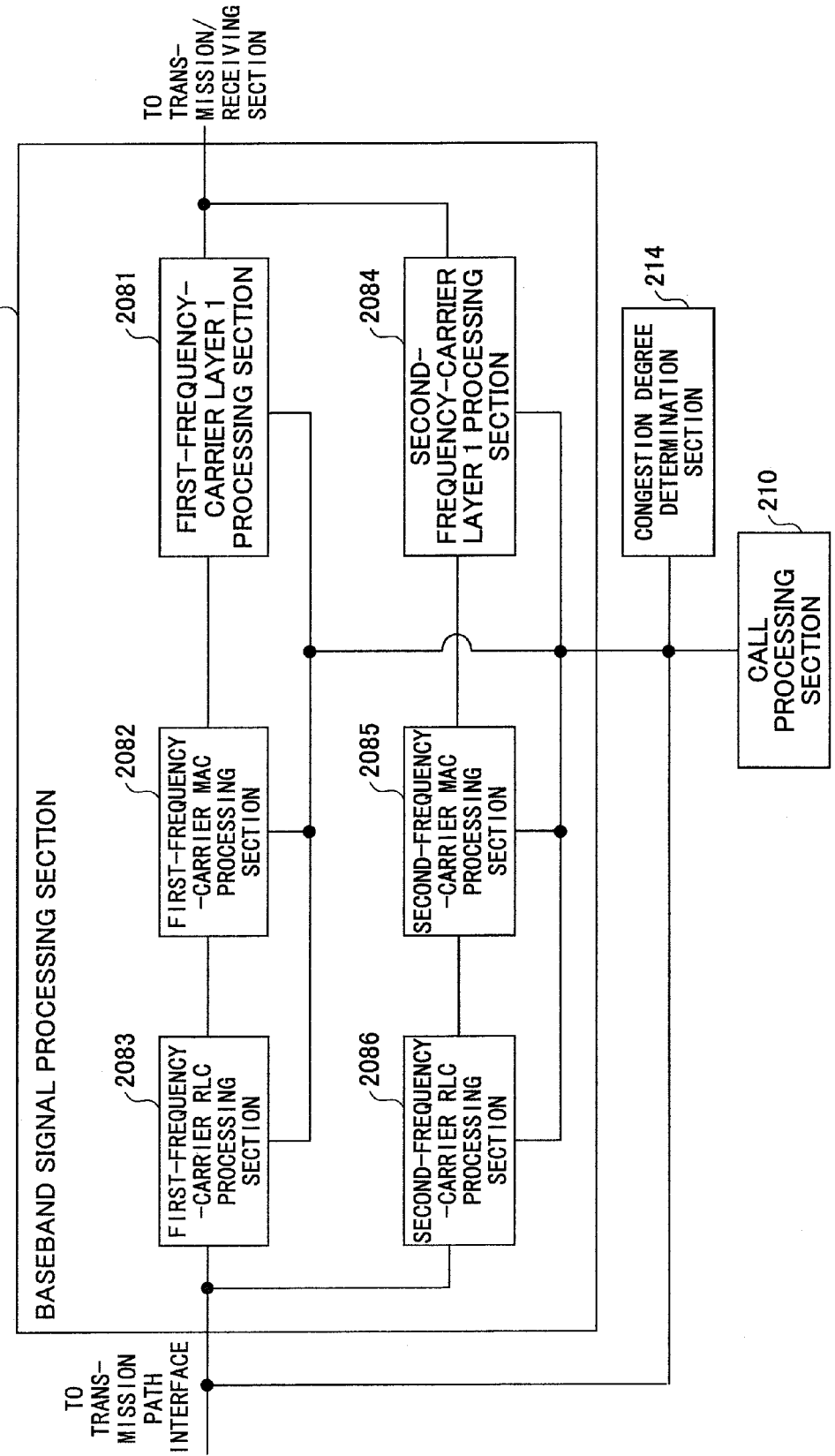
FIG. 4 is a schematic block diagram of a baseband signal processing section of the base station apparatus according to an embodiment of the present invention.

As shown in FIG. 4, the baseband signal processing section 208 includes a first-frequency-carrier layer 1 processing section 2081, a first-frequency-carrier MAC (Medium Access Control) processing section 2082, a first-frequency-carrier RLC processing section 2083, the second-frequency-carrier layer 1 processing section 2084, the second-frequency-carrier MAC processing section 2085, and the second-frequency-carrier RLC processing section 2086.

In the baseband signal processing section 208, the first-frequency-carrier layer 1 processing section 2081, the first-frequency-carrier MAC processing section 2082, the first-frequency-carrier RLC processing section 2083, the second-frequency-carrier layer 1 processing section 2084, the second-frequency-carrier MAC processing section 2085, the second-frequency-carrier RLC processing section 2086, the congestion degree determination section 214, and the call processing section 210 are connected to each other.

The first-frequency-carrier layer 1 processing section 2081 performs, for example, the channel coding process and the IFFT process on downlink data transmitted using the first frequency carrier and a channel decoding process, the IDFT process, and the FFT process on uplink data transmitted using the first frequency carrier and the like.

The first-frequency-carrier MAC processing section 2082 performs the MAC retransmission control processes, such as the HARQ transmission process, the scheduling process, the transport format selection process and the like on downlink data. Further, the first-frequency-carrier MAC processing section 2082 performs a receiving process of the MAC retransmission control data on uplink data and the like.

The first-frequency-carrier RLC processing section 2083 performs the segmentation and concatenation process and the RLC (Radio Link Control)-layer transmission processes such as a transmission process of RLC retransmission control data on downlink packet data. Further, the first-frequency-carrier RLC processing section 2083 performs the segmentation and concatenation process and the RLC-layer receiving processes such as a receiving process of RLC retransmission control data on uplink packet data. In addition to the above processes, the first-frequency-carrier RLC processing section 2083 may further perform PDCP-layer processes.

The second-frequency-carrier layer 1 processing section 2084 performs, for example, the channel coding process and the IFFT process on downlink data transmitted using the second frequency carrier and further performs a channel decoding process, the IDFT process, and the FFT process on uplink data transmitted using the second frequency carrier and the like. Further, the second-frequency-carrier layer 1 processing section 2084 measures a value of downlink transmission power and transmits the measurement value to the congestion degree determination section 214.

As the value of downlink transmission power, an instantaneous value of the downlink transmission power at a measurement timing or an averaged value obtained by averaging the downlink transmission power for a predetermined period before the measurement timing may be used. In this case, as a method of averaging, a simple arithmetical averaging method or an averaging method using a forgetting coefficient may be used. Further, as the value of downlink transmission power, an instantaneous value sampled at every predetermined sampling period or an average value obtained by averaging the sampled instantaneous values may be used.

The second-frequency-carrier MAC processing section 2085 performs the MAC retransmission control processes, such as the HARQ transmission process, the scheduling process, the transport format selection process and the like on downlink data. Further, the second-frequency-carrier MAC processing section 2085 performs a receiving process of the MAC retransmission control data on uplink data. Further, the second-frequency-carrier MAC processing section 2085 measures the amount of frequency resources used in uplink, the amount of frequency resources used in downlink, the number of mobile stations communicating using the second frequency carrier and the like and transmits the measurement results to the congestion degree determination section 214. The scheduling process performed by the second-frequency-carrier MAC processing section 2085 refers to the Persistent Scheduling process, in which at least one of the amount of frequency resources and the transmission power, the modulation scheme, and the subframes to be used for data transmission are statically allocated (i.e., allocated at every predetermined period). As described above, when the Dedicated Control Channel (DCCH) which is a control signal or the VoIP data before header compression are to be transmitted or received, the second-frequency-carrier MAC processing section 2085 may allocate radio resources based on the Dynamic Scheduling in which the radio resources are allocated using the Downlink Scheduling Information or Uplink Scheduling Grant as well as allocate the radio resources based on the Persistent Scheduling.

The second-frequency-carrier RLC processing section 2086 performs the segmentation and concatenation process and the RLC-layer transmission processes such as the transmission process of RLC retransmission control data on downlink packet data. Further, the second-frequency-carrier RLC processing section 2086 performs the segmentation and concatenation process and the RLC-layer receiving processes such as the receiving process of RLC retransmission control data on uplink packet data. In addition to the above processes, the second-frequency-carrier RLC processing section 2086 may further perform the PDCP-layer processes. Further, the second-frequency-carrier RLC processing section 2086 measures the amount of buffer used for the RLC layer or the PDCP layer and transmits the measurement result to the congestion degree determination section 214.

As described above, in the base station apparatus 200 according to an embodiment of the present invention, within an allowed frequency bandwidth in the radio communication system 1000, two (2) frequency carriers each having predetermined frequency bandwidth are provided so that one frequency carrier can be used for the communications based on the Dynamic Scheduling and the other frequency carrier can be used for the communications based on the Persistent Scheduling. Which of the frequency carriers is to be used is determined by the call processing section 210 based on at least one of the service type and the congestion degree of the communications using the other frequency carrier (to be used for the communications based on the Persistent Scheduling). Because of this feature, it may become possible to adequately and efficiently apply the Dynamic Scheduling and the Persistent Scheduling to each user data.

Next, a communication control method according to an embodiment of the present invention is described with reference to FIGS. 5 through 7. In the following, a case is described where, as shown in FIG. 1, the mobile station 120 in the cell 50 is about to newly start communication with the base station apparatus 200. Further, in the following, as is described above, it is assumed that the first frequency carrier is used for the communications based on the Dynamic Scheduling and that the second frequency carrier is used for the communications based on the Persistent Scheduling.

Figure 5:
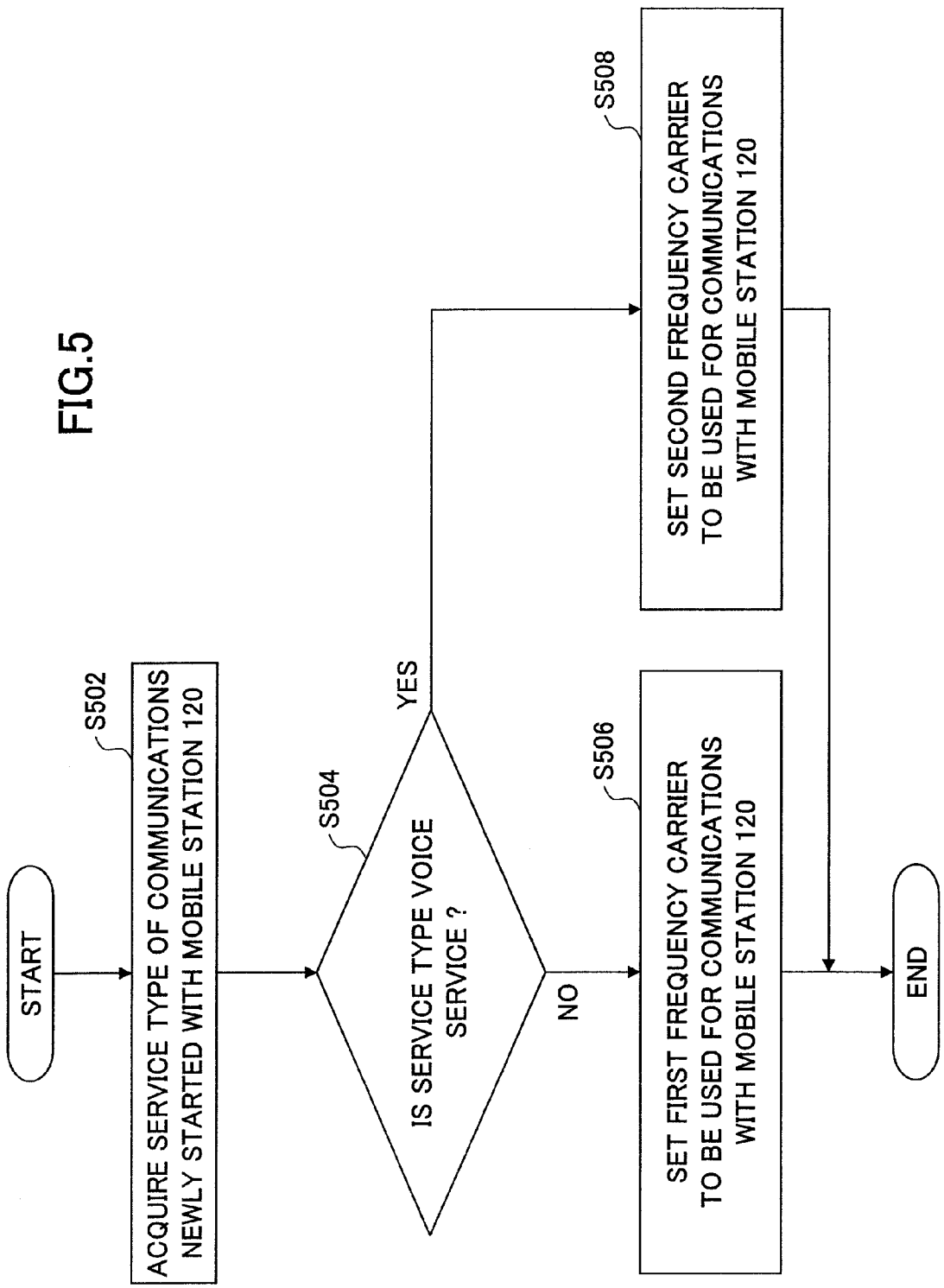
FIG. 5 is a flowchart showing a process of a communication control method according to an embodiment of the present invention.

FIG. 5 is a flowchart showing a communication control method according to an embodiment of the present invention. As shown in FIG. 5, in step S502, the service type of the communications of the mobile station 120 is acquired, the mobile station 120 being about to newly start the communications with the base station apparatus 200. Next, in step S504, it is determined whether the service type is the voice service. When determining that the service type is the voice service (YES in step S504), the process goes to step S508, in which the second frequency carrier is selected as the frequency carrier to be used for the communications between the mobile station 120 and the base station apparatus 200. Namely, in this case, the mobile station 120 newly communicates with the base station apparatus 200 using the second frequency carrier. As described above, the voices service refers to, for example, Speech service, PoC, VoP, AMR, AMR-WB and the like. Further, a Streaming Service may be included in the voice service. The PoC refers to a transceiver-type voice service performed on a Cellular system (i.e., a mobile communication system).

On the other hand, in step S504, when determining that the acquired service type is not the voice service (i.e., the service type is the service other than the voice service)(NO in step S504), the process goes to step S506, in which the first frequency carrier is selected as the frequency carrier to be used for the communications between the mobile station 120 and the base station apparatus 200. Namely, in this case, the mobile station 120 newly communicates with the base station apparatus 200 using the first frequency carrier. As described above, the service other than the voice service refers to a service such as i-mode (registered trademark), Web-browsing, FTP, PPP, mail transmission/receiving service and the like.

Figure 6:
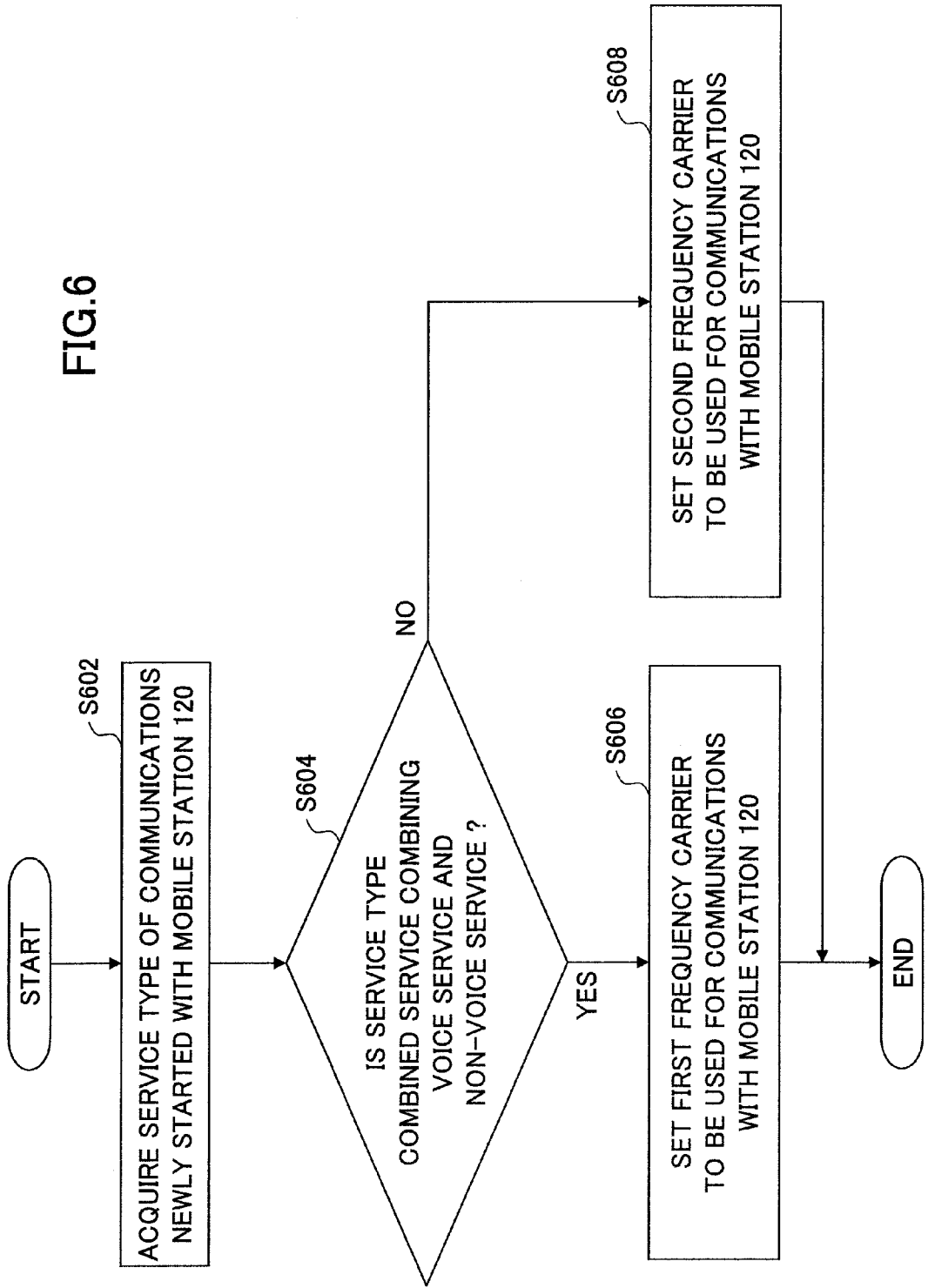
FIG. 6 is a flowchart showing a process of another communication control method according to an embodiment of the present invention.

FIG. 6 is a flowchart showing a communication control method according to another embodiment of the present invention. As shown in FIG. 6, in step S602, the service type of the communications of the mobile station 120 is acquired, the mobile station 120 being about to newly start the communications with the base station apparatus 200. Next, in step S604, it is determined whether the service type is either the combined service combining the voice service and the service other than the voice service (hereinafter the term "service other than the voice service" may be referred to as "non-voice service") or the service simultaneously providing the voice service and the non-voice service. When determining that the service type is either the combined service or the service simultaneously providing the voice service and the non-voice service (YES in step S604), the process goes to step S606, in which the first frequency carrier is selected as the frequency carrier to be used for the communications between the mobile station 120 and the base station apparatus 200. Namely, in this case, the mobile station 120 newly communicates with the base station apparatus 200 using the first frequency carrier.

On the other hand, in step S604, when determining that the acquired service type is neither the combined service nor the service simultaneously providing the voice service and the non-voice service (NO in step S604), the process goes to step S608, in which the second frequency carrier is selected as the frequency carrier to be used for the communications between the mobile station 120 and the base station apparatus 200. Namely, in this case, the mobile station 120 newly communicates with the base station apparatus 200 using the second frequency carrier.

Figure 7:
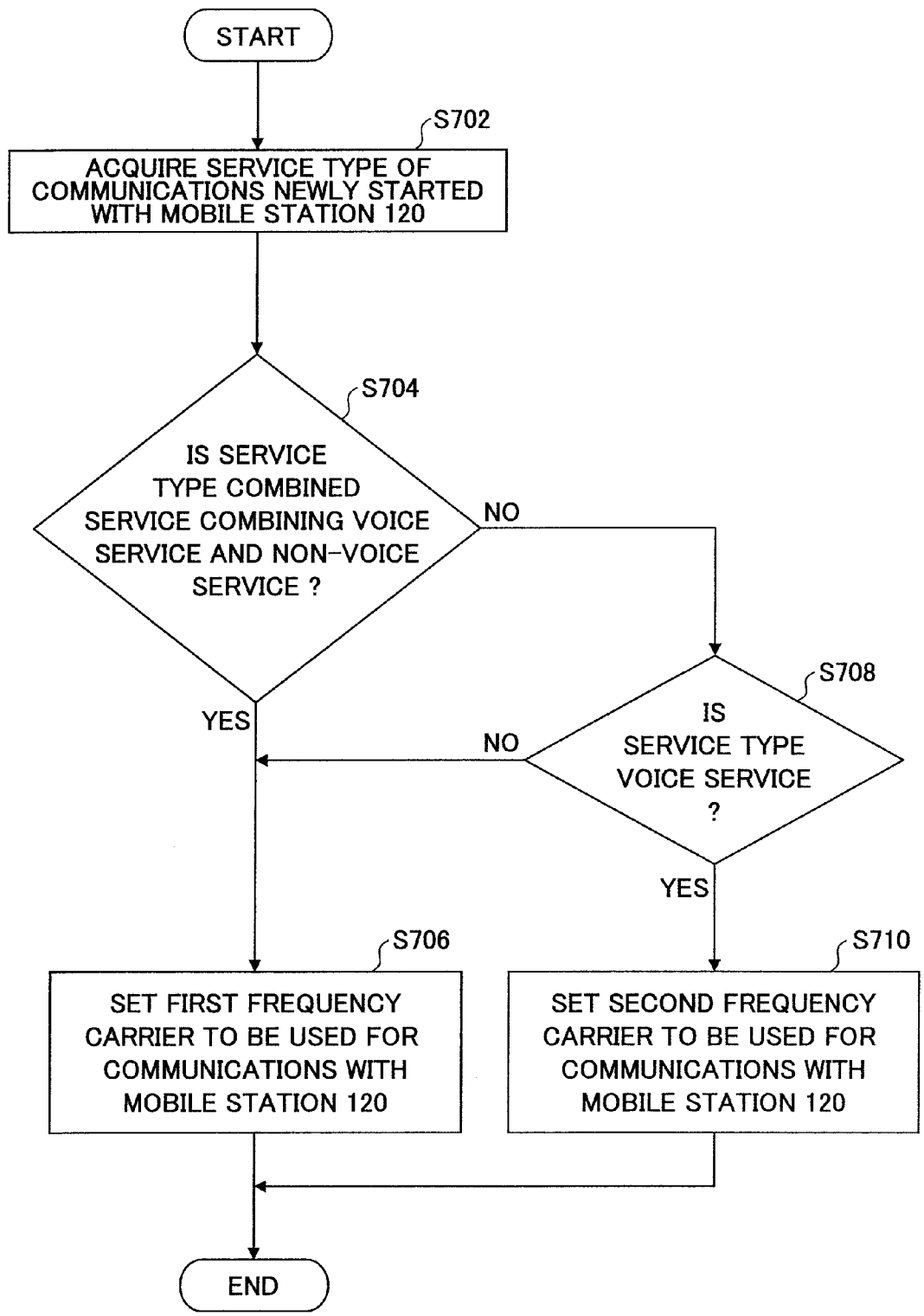
FIG. 7 is a flowchart showing a process of still another communication control method according to an embodiment of the present invention.

FIG. 7 is a flowchart showing a communication control method according to still another embodiment of the present invention. As shown in FIG. 7, in step S702, the service type of the communications of the mobile station 120 is acquired, the mobile station 120 being about to newly start the communication with the base station apparatus 200. Next, in step S704, it is determined whether the service type is either the combined service combining the voice service and the non-voice service or the service simultaneously providing the voice service and the non-voice service. When determining that the service type is either the combined service combining the voice service and the non-voice service or the service simultaneously providing the voice service and the non-voice service (YES in step S704), the process goes to step S706, in which the first frequency carrier is selected as the frequency carrier to be used for the communications between the mobile station 120 and the base station apparatus 200. Namely, in this case, the mobile station 120 newly communicates with the base station apparatus 200 using the first frequency carrier.

On the other hand, in step S704, when determining that the acquired service type is neither the combined service nor the service simultaneously providing the voice service and the non-voice service (NO in step S704), the process goes to step S708, in which it is determined whether the acquired service type is the voice service. When determining that the acquired service type is not the voice service (NO in step S708), the process goes to step S706, in which the first frequency carrier is selected. Namely, in this case, the mobile station 120 newly communicates with the base station apparatus 200 using the first frequency carrier.

On the other hand, in step S708, when determining that the acquired service type is the voice service (YES in step S708), the process goes to step S710, in which the second frequency carrier is selected as the frequency carrier to be used for the communications between the mobile station 120 and the base station apparatus 200. Namely, in this case, the mobile station 120 newly communicates with the base station apparatus 200 using the second frequency carrier.

Figure 8:
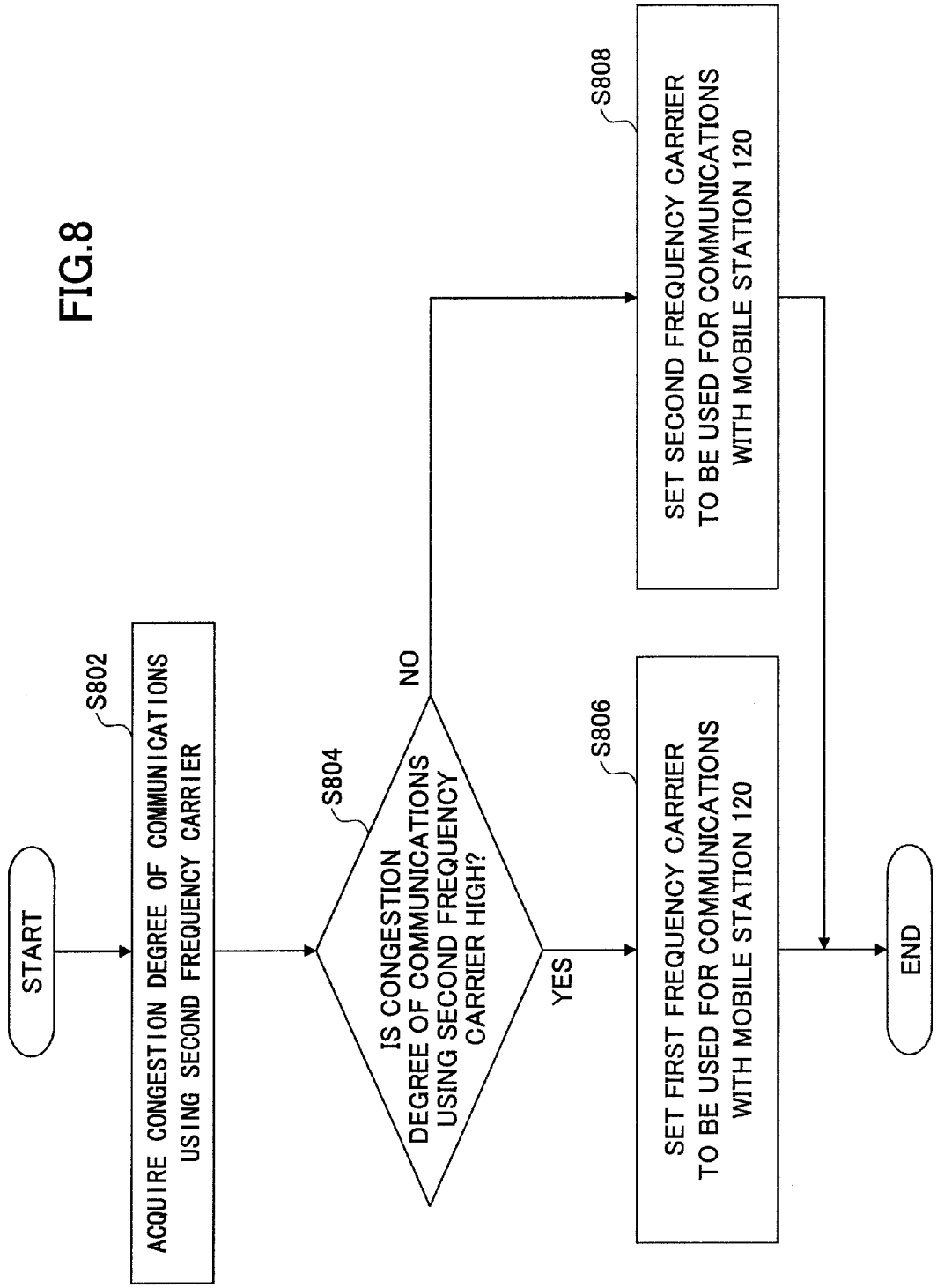
FIG. 8 is a flowchart showing a process of still another communication control method according to an embodiment of the present invention.

FIG. 8 is a flowchart showing a communication control method according to still another embodiment of the present invention. In this method, it is determined whether the congestion degree of the communications is high; and based on the determined result, either the first frequency carrier or the second frequency carrier is selected. As shown in FIG. 8, in step S802, data of the congestion degree of the communications using the second frequency carrier are acquired. As the data of the congestion degree, for example, the value of downlink transmission power, the amount of frequency resources used in uplink, the amount of frequency resources used in downlink, the number of mobile stations communicating using the second frequency carrier, the amount of buffer used for the RLC layer or the like may be used.

Next, in step S804, it is determined whether the acquired congestion degree of the communications using the second frequency carrier is high. More specifically, as described above, for example, five (5) determination formulas (inequalities) may be provided including the defined five (5) threshold values TH1 though TH5, so that the acquired data are compared with the corresponding threshold values to determine whether the congestion degree is high. In step S804, when determining that the congestion degree of the communications using the second frequency carrier is not high (NO in step S804), the process goes to step S808, in which the second frequency carrier is selected as the frequency carrier to be used for the communications between the mobile station 120 and the base station apparatus 200. Namely, in this case, the mobile station 120 newly communicates with the base station apparatus 200 using the second frequency carrier.

On the other hand, in step S804, when determining that the congestion degree of the communications using the second frequency carrier is high (YES in step S804), the process goes to step S806, in which the first frequency carrier is selected as the frequency carrier to be used for the communications between the mobile station 120 and the base station apparatus 200. Namely, in this case, the mobile station 120 newly communicates with the base station apparatus 200 using the first frequency carrier.

Figure 9:
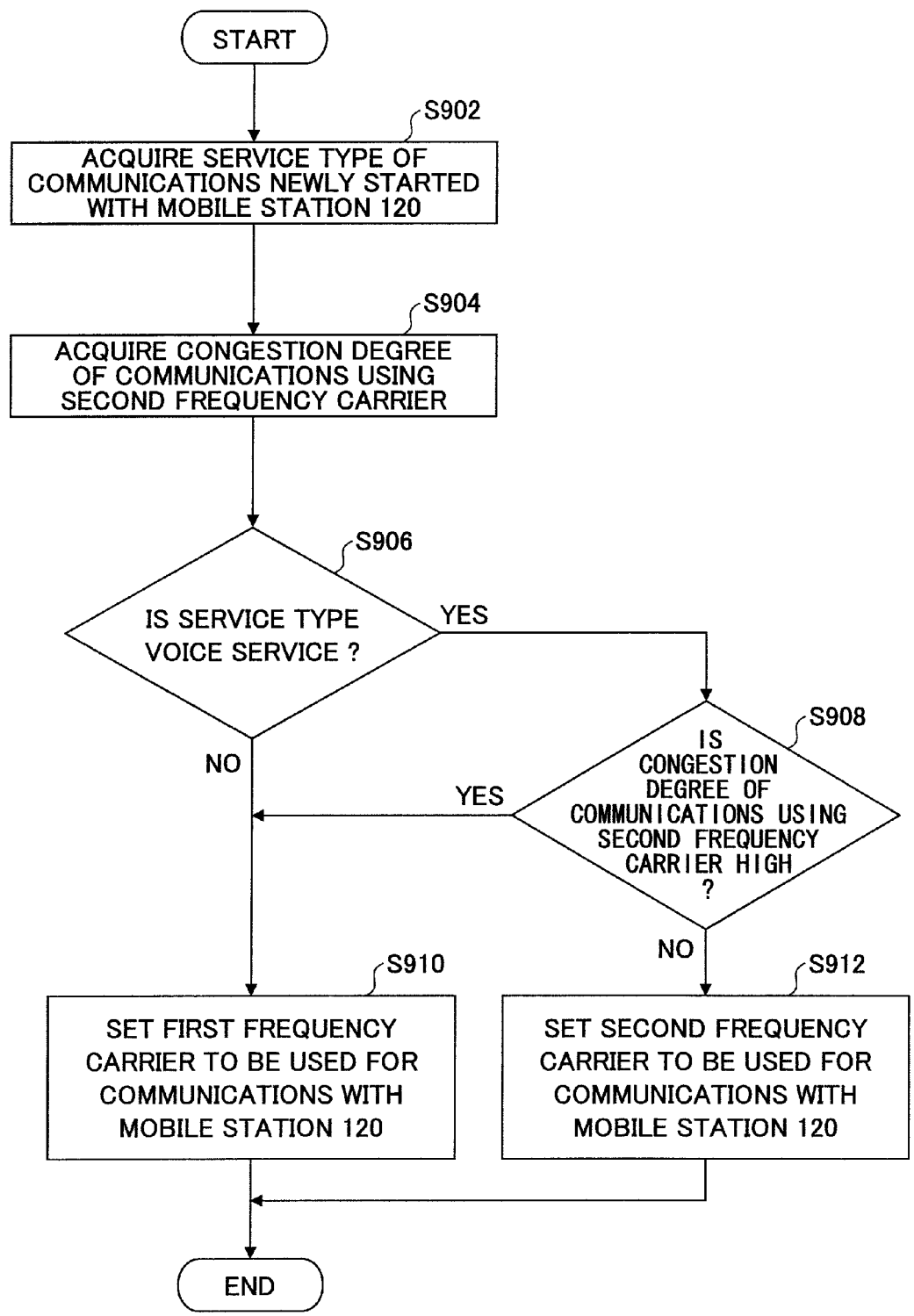
FIG. 9 is a flowchart showing a process of still another communication control method according to an embodiment of the present invention.

FIG. 9 is a flowchart showing a communication control method according to still another embodiment of the present invention. In this method, not only the service type but also the congestion degree is used to determine whether the first frequency carrier or the second frequency carrier is to be selected. As shown in FIG. 9, in step S902, the service type of the communications of the mobile station 120 is acquired, the mobile station 120 being about to newly start the communication with the base station apparatus 200. Next in step S904, the data of the congestion degree of the communications using the second frequency carrier are acquired.

Next in step S906, it is determined whether the service type is the voice service. When determining that the service type is not the voice service (NO in step S906), the process goes to step S910, in which the first frequency carrier is selected as the frequency carrier to be used for the communications between the mobile station 120 and the base station apparatus 200. Namely, in this case, the mobile station 120 newly communicates with the base station apparatus 200 using the first frequency carrier.

On the other hand, in step S906, when determining that the service type is the voice service (YES in step S906), the process goes to step S908, in which it is determined whether the congestion degree of the communications using the second frequency carrier is high. In step S908, when determining that the congestion degree of the communications using the second frequency carrier is not high (NO in step S908), the process goes to step S912, in which the second frequency carrier is selected as the frequency carrier to be used for the communications between the mobile station 120 and the base station apparatus 200. Namely, in this case, the mobile station 120 newly communicates with the base station apparatus 200 using the second frequency carrier.

On the other hand, in step S908, when determining that the congestion degree of the communications using the second frequency carrier is high (YES in step S908), the process goes to step S910, in which the first frequency carrier is selected as the frequency carrier to be used for the communications between the mobile station 120 and the base station apparatus 200. Namely, in this case, the mobile station 120 newly communicates with the base station apparatus 200 using the first frequency carrier.

In short, according to the communication control method of FIG. 9, in a case where the service type of the communications of the mobile station 120 is the voice service and the congestion degree of the communications using the second frequency carrier is not high, the second frequency carrier is selected, and otherwise, the first frequency carrier is selected.

Figure 10:
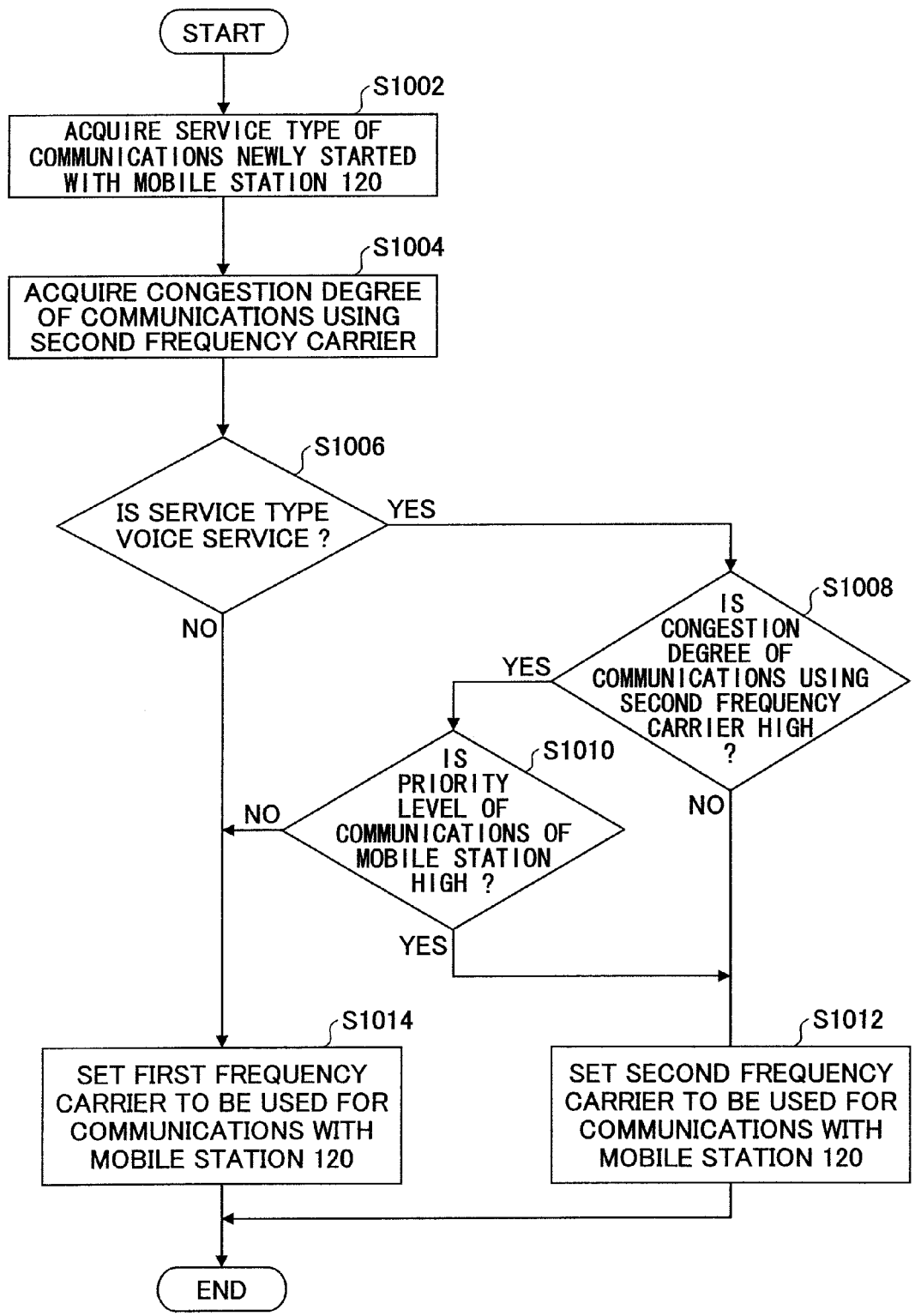
FIG. 10 is a flowchart showing a process of still another communication control method according to an embodiment of the present invention.

FIG. 10 is a flowchart showing a communication control method according to still another embodiment of the present invention. As shown in FIG. 10, in step S1002, the service type of the communications of the mobile station 120 is acquired, the mobile station 120 being about to newly start the communication with the base station apparatus 200. Next in step S1004, the data of the congestion degree of the communications using the second frequency carrier are acquired.

Next in step S1006, it is determined whether the service type is the voice service. When determining that the service type is not the voice service (NO in step S1006), the process goes to step S1014, in which the first frequency carrier is selected as the frequency carrier to be used for the communications between the mobile station 120 and the base station apparatus 200. Namely, in this case, the mobile station 120 newly communicates with the base station apparatus 200 using the first frequency carrier.

On the other hand, in step S1006, when determining that the service type is the voice service (YES in step S1006), the process goes to step S1008, in which it is determined whether the congestion degree of the communications using the second frequency carrier is high. In step S1008, when determining that the congestion degree of the communications using the second frequency carrier is not high (NO in step S1008), the process goes to step S1012, in which the second frequency carrier is selected as the frequency carrier to be used for the communications between the mobile station 120 and the base station apparatus 200. Namely, in this case, the mobile station 120 newly communicates with the base station apparatus 200 using the second frequency carrier.

On the other hand, in step S1008, when determining that the congestion degree of the communications using the second frequency carrier is high (YES in step S1008), the process goes to step S1010, in which it is determined whether the priority level (of the service) with respect to the mobile station 120 is high. When determining that the priority level with respect to the mobile station 120 is high (YES in step S1010), the process goes to step S1012, in which the second frequency carrier is selected as the frequency carrier to be used for the communications between the mobile station 120 and the base station apparatus 200. Namely, in this case, the mobile station 120 newly communicates with the base station apparatus 200 using the second frequency carrier. Whether the priority level is high may be determined based on, for example, the contract type described above or emergency level of the service (communications). More specifically, for example, if the destination of the call initiated from the mobile station 120 is a fire department or a police station, the priority level (of the service) with respect to the mobile station 120 may be determined as high. Further, for example, in a case where a user of the mobile station 120 calls for an emergency vehicle such as an ambulance, fire engines, and a police car, even when it is determined that the congestion degree of the communications using the second frequency carrier is high, the priority level (of the service) with respect to the mobile station 120 may be determined as high so that the second frequency carrier be selected. Namely, in this case, the second frequency carrier can be used for the communications between the mobile station 120 and the base station apparatus 200. As described above, the second frequency carrier is used for the communications based on the Persistent Scheduling; therefore, due to its high QoS characteristics, the user of the mobile station 120 may be more likely to tell the destination of the emergency vehicle more surely and quickly.

On the other hand, in step S1010, When determining that the priority level with respect to the mobile station 120 is not high (NO in step S1010), the process goes to step S1014, in which the first frequency carrier is selected as the frequency carrier to be used for the communications between the mobile station 120 and the base station apparatus 200. Namely, in this case, the mobile station 120 newly communicates with the base station apparatus 200 using the first frequency carrier.

In the above description, in step S1010, when determining that the priority level with respect to the mobile station 120 is high (YES in step S1010), the second frequency carrier is selected. However, in this case, instead of selecting the second frequency carrier, the first frequency carrier may be alternatively selected. In this case, by increasing the priority level of the communications with the mobile station using the first frequency carrier, more reliable emergency communications may be achieved as described in above example; and as a result, the user of the mobile station 120 may become more likely to tell the destination of the emergency vehicle more surely and quickly.

As described above, in the communication control methods according to embodiments of the present invention, within the allowed frequency bandwidth in the radio communication system 1000, two (2) frequency carriers each having predetermined frequency bandwidth are provided so that one frequency carrier is used for the communications based on the Dynamic Scheduling and the other frequency carrier is used for the communications based on the Persistent Scheduling. Which of the frequency carriers is to be used is determined based on the service type (FIGS. 5 through 7), the congestion degree of the communications using the other frequency carrier (FIG. 8) or the combination thereof (FIGS. 9 and 10). Because of this feature, it may become possible to adequately and efficiently apply the Dynamic Scheduling and the Persistent Scheduling to each user data.

As described above, the present invention is described with reference to some embodiments. However, the present invention is not limited to the embodiments described above, and various modifications may also be made without departing the spirit and scope of the present invention.

For example, in a case where two (2) or more first frequency carriers are provided, when the first frequency carrier is selected (as the carrier to be used in the communications between the mobile station and the base station apparatus) based on at least one of the service type and the congestion degree, which of the first frequency carriers is to be selected may be determined based on the service type. In this case, which of the first frequency carriers is to be selected may be determined based on the frequency bandwidths of the first frequency carriers.

Otherwise, in the same case where two (2) or more first frequency carriers are provided, when the first frequency carrier is selected (as the carrier to be used in the communications between the mobile station and the base station apparatus) based on at least one of the service type and the congestion degree, which of the first frequency carriers is to be selected may be determined based on the congestion degree of the communications using the first frequency carriers. To make it possible to determine the congestion degree of the communications using the first frequency carriers (similar to the second-frequency-carrier RLC processing section 2086, the second-frequency-carrier MAC processing section 2085, and the second-frequency-carrier layer 1 processing section 2084), the first-frequency-carrier RLC processing section 2083, the first-frequency-carrier MAC processing section 2082, and the first-frequency-carrier layer 1 processing section 2081 acquire (measure) the value of downlink transmission power, the amount of frequency resources used in uplink, the amount of frequency resources used in downlink, the number of mobile stations communicating using the second frequency carrier, and the amount of buffer used for the RLC layer and transmits the measurement results to the congestion degree determination section 214 and the call processing section 210.

The above described embodiments may also be applied to a case where two (2) or more second frequency carriers are provided. Namely, in a case where two (2) or more second frequency carriers are provided, when the second frequency carrier is selected (as the carrier to be used in the communications between the mobile station and the base station apparatus) based on at least one of the service type and the congestion degree, which of the second frequency carriers is to be selected may be determined based on the service type. In this case, which of the second frequency carriers is to be selected may be determined based on the frequency bandwidths of the second frequency carriers. Otherwise, in the same case where two (2) or more second frequency carriers are provided, when the second frequency carrier is selected (as the carrier to be used in the communications between the mobile station and the base station apparatus) based on at least one of the service type and the congestion degree, which of the second frequency carriers is to be selected may be determined based on the congestion degree of the communications using the second frequency carriers.

Further, in the above embodiments, a case is described where, when the mobile station 120 newly communicates with the base station apparatus 200 in the cell 50, either the first frequency carrier or the second frequency carrier is selected. Herein, the case where the mobile station 120 newly communicates with the base station apparatus 200 in the cell 50 may refer to not only a case where actually the mobile station 120 newly communicates with the base station apparatus 200 in the cell 50 but also a case where the mobile station 120 moves into the cell 50 from a neighboring cell and newly starts communications with the base station apparatus 200 in the cell 50.

Further, in the above embodiments, a case is described where, when the mobile station 120 newly communicates with the base station apparatus 200 in the cell 50, either the first frequency carrier or the second frequency carrier is selected. However, the present invention is not limited to this case. For example, when the service type of the communications having been established between the base station apparatus 200 and the mobile station 120 is changed, the base station apparatus 200 may exchange the frequency carriers between the first frequency carrier and the second frequency carrier based on at least one of the service type after the change and the congestion degree of the communications.

More specifically, for example, in a case where the mobile station $110_m$ transmits voice data, if the mobile station 120 further starts the transmission of mail or packet data, the frequency carrier selected to be used for the communications between the mobile station 110. and the base station apparatus 200 may be changed from the second frequency carrier to the first frequency carrier (i.e., the scheduling applied to the communications may be changed from the Persistent Scheduling to the Dynamic Scheduling). Further, for example, when the mobile station 100. ends mail transmission and then starts voice data transmission, the frequency carrier selected to be used for the communications between the mobile station 100. and the base station apparatus 200 may be changed from the first frequency carrier to the second frequency carrier (i.e., the scheduling applied to the communications may be changed from the Dynamic Scheduling to the Persistent Scheduling).

Further, in a case where the mobile station $110_m$ transmits voice data, for example, if the congestion degree of the communications using the second frequency carrier is changed from not high to high, the frequency carrier selected to be used for the communications between the mobile station $110_m$ and the base station apparatus 200 may be changed from the second frequency carrier to the first frequency carrier (i.e., the scheduling applied to the communications may be changed from the Persistent Scheduling to the Dynamic Scheduling). Further, in a case where the mobile station $100_n$ is in communication with the base station apparatus 200, if the congestion degree of the communications using the second frequency carrier is changed from high to not high, the frequency carrier selected to be used for the communications between the mobile station $100_n$ and the base station apparatus 200 may be changed from the first frequency carrier to the second frequency carrier (i.e., the scheduling applied to the communications may be changed from the Dynamic Scheduling to the Persistent Scheduling). Further, whether the congestion degree of the communications using the second frequency carrier is high may be determined by using, for example, the above determination formulas (inequalities). Further, in the case where the frequency carrier is changed from the second frequency carrier to the first frequency carrier, the priority level of the resource allocation with respect to the communications using the first frequency carrier may be increased. In this case, it may become possible to achieve high QoS for voice service even in the communications using the first frequency carrier providing the best-effort-type service.

Further, in the above embodiments, the call processing section 210 is configured to have all the functions for setting first and second frequency carriers, determining the service type to be provided to the mobile station 120, and selecting the frequency carrier. However, for example, the call processing section 210 may be configured to have only the function for selecting the frequency carrier; and therefore a frequency carrier setting section for setting first and second frequency carriers and a service type determination section for determining the service type may be additionally provided. Further, the call processing section 210 may be configured to include the congestion degree determination section 214 for determining the congestion degree of the communications.

Further, when the frequency carrier to be selected is determined based on the congestion degree of the communications, the determination may be made by acquiring not the congestion degree of the communications using the second frequency carrier but the congestion degree of the communications using the first frequency carrier so that one of the frequency carriers can be selected based on the acquisition result.

The present application is based on and claims the benefit of priority of Japanese Patent Application No. 2007-161941, filed on Jun. 19, 2007, and the entire contents of Japanese Patent Application No. 2007-161941 are hereby incorporated herein by reference.

The invention claimed is:

1. A base station apparatus to be used for a mobile communication system capable of providing communications using plural frequency carriers, the base station apparatus comprising:
 a frequency carrier selection unit configured to select one of a first frequency carrier and a second frequency carrier as a frequency carrier to be used for the communications based on at least one of a service type of the communications and a congestion degree of the communications, the first frequency carrier being used in Dynamic Scheduling for communications based on allocation in which radio resources are dynamically allocated, the second frequency carrier being used in Persistent Scheduling for communications based on allocation in which the radio resources are allocated at every predetermined period,
 wherein, when the service type is a voice service, the frequency carrier selection unit is configured to select one of the first frequency carrier and the second frequency carrier based on the congestion degree, and
 wherein, when the service type is a voice service, upon selecting the first frequency carrier, the frequency carrier selection unit is configured to determine whether a priority level with respect to a service requested by a mobile station communicating with the base station is high and select the second frequency carrier as the frequency carrier to be used for the communications when determining that the priority level is high.

2. The base station apparatus according to claim 1, further comprising:
 a frequency carrier setting unit configured to set the first frequency carrier and the second frequency carrier.

3. The base station apparatus according to claim 2, wherein the frequency carrier setting unit sets one or more first frequency carriers and one or more second frequency carriers.

4. The base station apparatus according to claim 1, wherein when the service type is a voice service, the frequency carrier selection unit selects the second frequency carrier.

5. The base station apparatus according to claim 1, wherein when the service type is a service other than a voice service, the frequency carrier selection unit selects the first frequency carrier.

6. The base station apparatus according to claim 1, wherein when the service type is a combined service combining a voice service and a service other than the voice service, the frequency carrier selection unit selects the first frequency carrier.

7. The base station apparatus according to claim 1, wherein the congestion degree refers to a congestion degree of the communications using the second frequency carrier and is determined based on at least one of a number of mobile stations communicating using the second frequency carrier, a value of downlink transmission power, and an amount of frequency resources used in uplink or downlink.

8. The base station apparatus according to claim 7, wherein the number of mobile stations refers to at least one of a number of mobile stations having data to be transmitted in a downlink transmission buffer, a number of mobile stations having data to be transmitted in a uplink transmission buffer, a number of mobile stations which are not in DRX mode, a number of mobile stations in RRC connected mode and a number of mobile stations having a transmission data rate less than a predetermined threshold value.

9. The base station apparatus according to claim 4, wherein the voice service refers to Voice over IP, PoC, or Speech service.

10. A communication control method for controlling communications in a mobile communication system capable of providing communications using plural frequency carriers, the communication control method comprising:
 a frequency carrier setting step of setting a first frequency carrier and a second frequency carrier, the first frequency carrier being used in Dynamic Scheduling for communications based on allocation in which radio resources are dynamically allocated, the second frequency carrier being used in Persistent Scheduling for communications based on allocation in which the radio resources are allocated at every predetermined period; and
 a frequency carrier selection step of selecting one of the first frequency carrier and a second frequency carrier based on at least one of a service type of the communications and a congestion degree of the communications,
 wherein, when the service type is a voice service, a frequency carrier selection unit is configured to select one of the first frequency carrier and the second frequency carrier based on the congestion degree, and wherein, when the service type is a voice service, upon selecting the first frequency carrier, the frequency carrier selection unit is configured to determine whether a priority level with respect to a service requested by a mobile station communicating with the base station is high and select the second frequency carrier as the frequency carrier to be used for the communications when determining that the priority level is high.

* * * * *